UNITED STATES PATENT OFFICE.

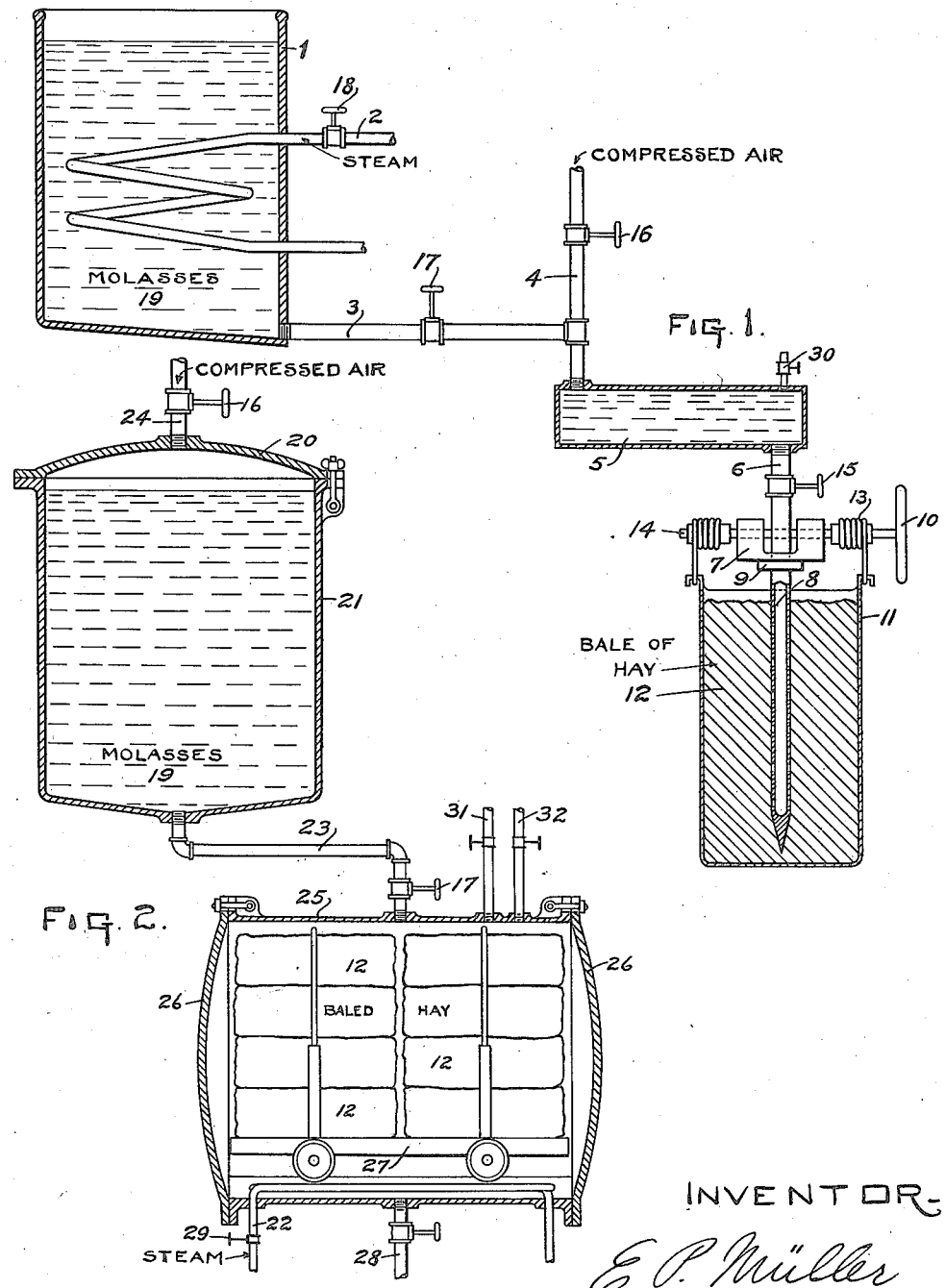

EDWARD P. MÜLLER, OF CHICAGO, ILLINOIS, ASSIGNOR OF ONE-HALF TO ALLIS-CHALMERS MANUFACTURING COMPANY, OF MILWAUKEE, WISCONSIN, A CORPORATION OF DELAWARE.

PROCESS OF IMPREGNATING BALED FOODS.

1,196,138.     Specification of Letters Patent.     Patented Aug. 29, 1916.

Application filed August 2, 1915. Serial No. 43,702.

*To all whom it may concern:*

Be it known that I, EDWARD P. MÜLLER, a citizen of the United States, residing at Chicago, in the county of Cook and State of Illinois, have invented a certain new and useful Improvement in Processes of Impregnating Baled Foods, of which the following is a specification.

This invention relates to improvements in a process of treating one substance with another and is specifically applicable to the impregnation of baled alfalfa hay in its natural state, with molasses.

An object of the invention is to provide a simple and efficient process of treating one substance with another to produce an edible compound.

Another object is to provide a process of treating an edible substance with another substance.

Still another object is to provide a process of impregnating a substance with an edible substance.

A further object is to provide a process of treating solid edible substance with liquid edible substance.

Another object is to provide a process for treating edible substance in quantity.

A further object is to provide as an article of manufacture, a bale of edible substance impregnated with another material.

Another object is to provide as an article of manufacture, a bale of material impregnated with edible substance.

It has been customary to mix molasses with cut hay in the form of meal and to subsequently place the mixture in bags for convenient handling. This cutting and bagging considerably raised the cost of feed to the consumer. With the present invention, the cost of the feed is reduced to a minimum with at least the same facilities for handling as before.

A clear conception of an embodiment of the invention and of the apparatus for carrying on the operation of the process, may be had by referring to the accompanying drawing and specification, in which like reference characters designate the same or similar parts.

Figure 1 is a sectional view of an apparatus for impregnating single bales of solid edible substance, such as alfalfa hay, with a liquid substance, such as molasses. Fig. 2 is a sectional view of an apparatus drawn to a smaller scale, for impregnating at a single operation a plurality of individual bales of solid edible substance, such as alfalfa hay, with a liquid substance, such as molasses.

While the solid edible substance to which the present process is disclosed as being applied, is baled alfalfa hay in its natural state, it should be understood that it is intended not to limit the scope of the process to such application. It should also be understood that the invention is not to be restricted to the use of molasses as an impregnating agent.

Referring specifically to Fig. 1, the apparatus comprises essentially a molasses tank 1, a measuring tank 5, and a stationary distributing pipe 8, these elements being connected by suitable piping. The molasses tank 1 is filled with molasses 19 and is provided with a steam heating coil 2. The admission of steam or other heating agency to the coil 2 is controllable by means of a suitable steam valve 18. The molasses discharge pipe 3 connects with the lower extremity of the tank 1 and is provided with a discharge controlling valve 17. A compressed air inlet pipe 4, which is controllable by means of an air valve 16, connects with the pipe 3, the pipes 3 and 4 discharging through a common nipple into an end of the measuring tank 5. The measuring tank delivery pipe 6 connects directly with the upper end of the distributing pipe 8, communication between the pipes 6 and 8 being controllable by means of the valve 15. A suitable air vent 30 is provided at an upper portion of the tank 5. The stationary distributing pipe 8 has a pointed lower end and is provided with a number of radial discharge openings for delivering the molasses to the interior of the bale 12 which is being impregnated.

The upper extremity of the pipe 8 is provided with a stationary thrust collar 9 which forms a support for the bearings 7. The rotary shaft 14 is mounted in the bearing 7 and carries two drums which together with the shaft 14 are rotatable by means of the operating hand wheel 10. Cables 13 coact with the drums on the shaft 14 and have their corresponding ends connected with projections formed on the bale retaining casing 11. The casing 11 is preferably formed of thin sheet metal and is of a size just sufficient to hold an ordinary bale of hay 12, which is to be treated.

The operation of the device disclosed in Fig. 1 is as follows: The tank 1 is filled with molasses 19 which is heated by means of steam or other heating agent, passed through the coil 2. The molasses 19 after heating is permitted to fill the measuring tank 5, the valves 15, 16, being closed, and the valve 17 and vent 30 being open during such filling of the tank 5. The bale 21 is then inserted within the casing 11, after which the casing is raised by rotation of the hand wheel 10 and shaft 14 to the position indicated in Fig. 1, the pipe 8 being embedded in the central portion of the bale 12. After the bale 12 has been thus properly positioned and the measuring tank 5 filled with molasses, the valve 17 and vent 30 are closed, and the valves 15, 16, opened. Upon opening of the valve 16, compressed air passes through the pipe 4 and forces the molasses 19 from within the tank 5 through the pipes 6 and 8 into the central portion of the bale 12. The molasses entering the bale 12 is distributed partly by capillary attraction and partly by gravity, through the bale 12 and is eventually absorbed by the particles of hay comprising the bale.

Referring specifically to Fig. 2, the apparatus comprises essentially a molasses tank 21, a treating cylinder 25, and a treating car 27. The tank 21 has a readily removable top cover 20 through which the tank may be filled with molasses 19. The cover 20 is provided with a compressed air inlet pipe 24 which is controllable by means of an air valve 16. The molasses discharge pipe 23 which is controllable by means of a molasses discharge valve 17, connects the lower extremity of the molasses tank 21 with an upper portion of the treating cylinder 25. The treating cylinder 25 has removable end heads 26 and is provided with rails extending longitudinally thereof, upon which the treating car 27 is adapted to travel while entering and leaving the cylinder. The lower portion of the treating cylinder 25 is provided with a heating coil 22 controllable by means of a valve 29. A suitable valve controlled drain pipe 28 is provided at the lower extremity of the tank 25. The tank 25 is also provided at its upper portion, with a valve controlled air exhaust pipe 31 and supplemental compressed air inlet pipe 32. As disclosed in the figure, the car 27 within the cylinder 25 is loaded with a plurality of bales 12 of the hay which is to be treated. While only one car 27 is shown within the cylinder 25, it is to be understood that this cylinder may be made of sufficient length to receive a number of loaded cars.

One method of operation of the device disclosed in Fig. 2 is as follows: The molasses tank 21 is filled with molasses 19, after which the cover 20 is firmly secured in place and the pipe 24 is connected to the source of compressed air. The loaded treating car 27 is placed within the treating cylinder 25 and the end heads 26 are secured in place. With the apparatus thus arranged, with the valve in the discharge pipe 28 closed, the valve in the air exhaust pipe 31 open, and the valve in the supplemental air inlet pipe 32 closed, if the valves 16, 17, are opened, the compressed air flowing into the tank 21 through the air pipe 24, forces the molasses 19 through the pipe 23 into the cylinder 25 filling the same. Steam or other heating agent may then be admitted to the coil 22 through the valve 29 to heat the molasses and to maintain the same in a highly fluent condition. After the bales 12 have become thoroughly saturated with the molasses 19 thus admitted to the tank 25, the valve 17 is closed and the discharge valve in the pipe 28 opened, whereby the molasses within the cylinder 25 which has not been absorbed by the bales 12 is drawn off. The end heads 26 may then be removed after which the car 27 and bales may be withdrawn.

Another method of operation of the device disclosed in Fig. 2 is as follows: The tank 21 is filled with molasses 19 and the loaded car 27 is inserted within the cylinder 25, as before. The valves in the pipes 28, 31 and 32 are then closed and the valves 29, 16 and 17 are opened. After the cylinder 25 has partially filled with molasses 19, the valve 17 is closed and the air exhaust valve in the pipe 31 is opened. Upon opening the valve in the pipe 31 and exhausting the air from within the cylinder 25 to form a partial vacuum, the molasses 19 enters the portions of the bales 12 which were previously filled with the compressed air. After the bales 12 have been saturated with molasses, the valve in the discharge pipe 28 may again be opened to withdraw the surplus molasses. The bales may then be removed as before.

Still another method of operation of the device disclosed in Fig. 2 is as follows: The tank 21 is filled with molasses 19 and the loaded car 27 is inserted within the cylinder 25, as before. Compressed air is then admitted to the interior of the cylinder 25 through the pipe 32, the valves in the pipes 23, 28 and 31 being closed at the time. This compressed air fills the cavities in the bales 12. The molasses 19 is then admitted to the tank 25 under compressed air pressure which is higher than that at first admitted. The pressure in the cylinder 25 is then reduced by closing the valve 17, whereupon the compressed air within the bales 12 presses the excess of molasses out of the hay. The excess molasses may then be withdrawn and the bales 12 removed as before.

While the apparatus is capable of other operations, it is believed that the three methods described are sufficient to clearly demonstrate the utility of the device. It will be noted that by the use of the present process, the hay while in its natural state may be readily impregnated with molasses. The baling of the hay permits ready handling thereof and also permits impregnation of large quantities with a comparatively small and simple apparatus. While the material impregnated as well as that employed to impregnate, are disclosed as specific kinds of edible substances, it is not intended to limit the invention to such disclosure.

It should be understood that it is not desired to limit the present invention to the exact steps of the process described, for obvious modifications may occur to a person skilled in the art.

It is claimed and desired to secure by Letters Patent,—

1. The process of treating edible substance which comprises, baling the edible substance, and passing into the bale impregnating material containing food values.

2. The process of treating material with edible substance having a food value which comprises, baling the material, and passing the edible substance into the bale.

3. The process of treating one edible substance with another edible substance having a food value which comprises, baling one of the substances, and passing the other substance into the bale.

4. The process of treating solid edible substance with liquid edible substance which comprises, baling the solid substance, and passing the liquid substance into the bale.

5. The process of treating solid edible substance with liquid edible substance which comprises, baling the solid substance, and forcing the liquid substance into the bale by means of fluid under pressure.

6. The process of treating hay with liquid edible substance which comprises, baling the hay, and passing the liquid substance into the bale.

7. The process of treating alfalfa with molasses which comprises, baling the alfalfa, and passing molasses into the bale.

8. The process of treating edible substance in quantity which comprises, baling the substance, and impregnating at a single operation a plurality of the individual bales.

In testimony whereof, the signature of the inventor is affixed hereto.

EDWARD P. MÜLLER.